Oct. 19, 1943.　　　　G. D. HARRIS　　　　2,332,218
EDUCATIONAL APPLIANCE FOR AIRPLANE OPERATION
Filed April 4, 1942　　　2 Sheets-Sheet 2
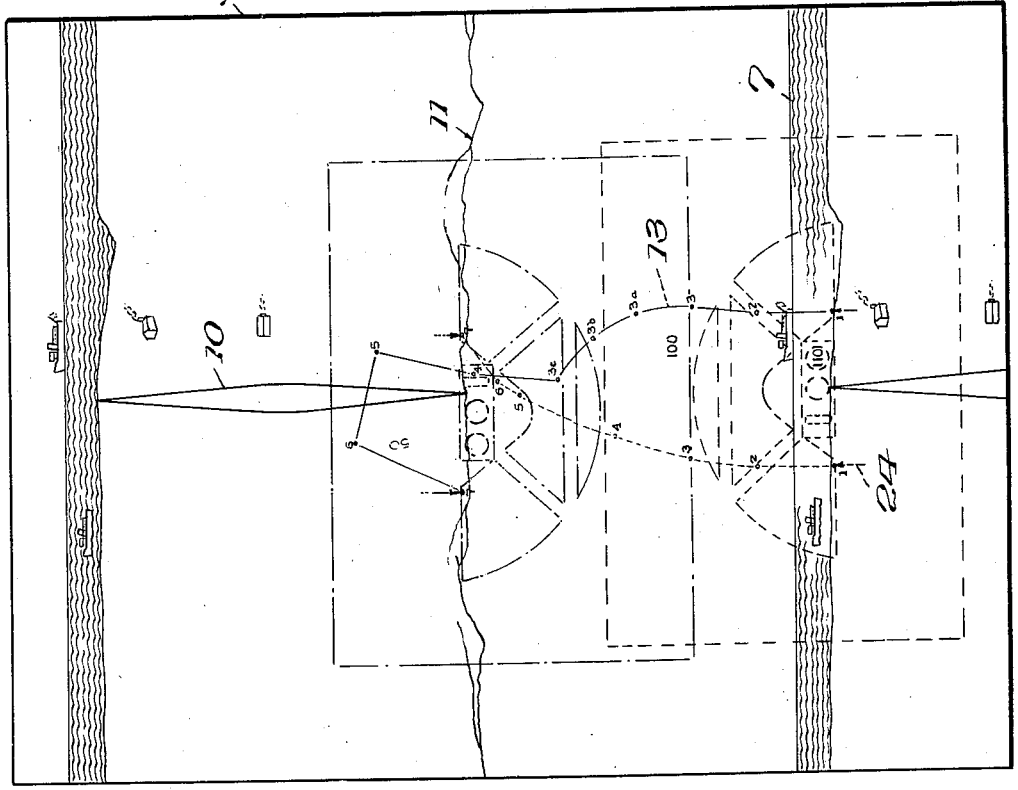
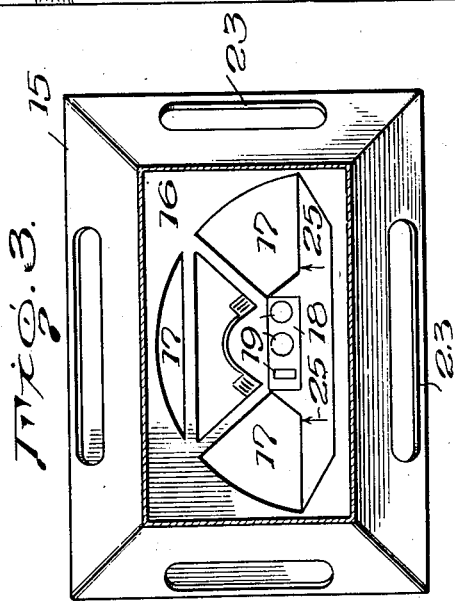
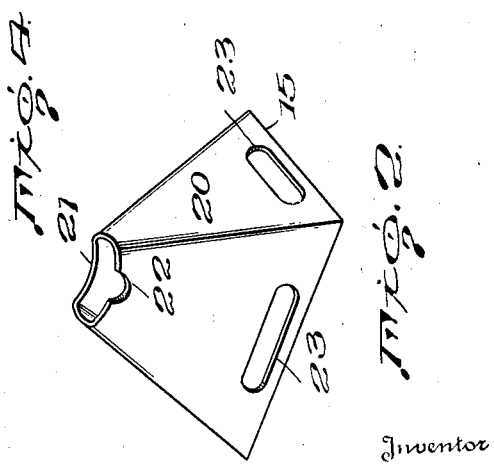
Inventor
Grant D. Harris,
By Bernard F. Garvey
Attorney Patented Oct. 19, 1943

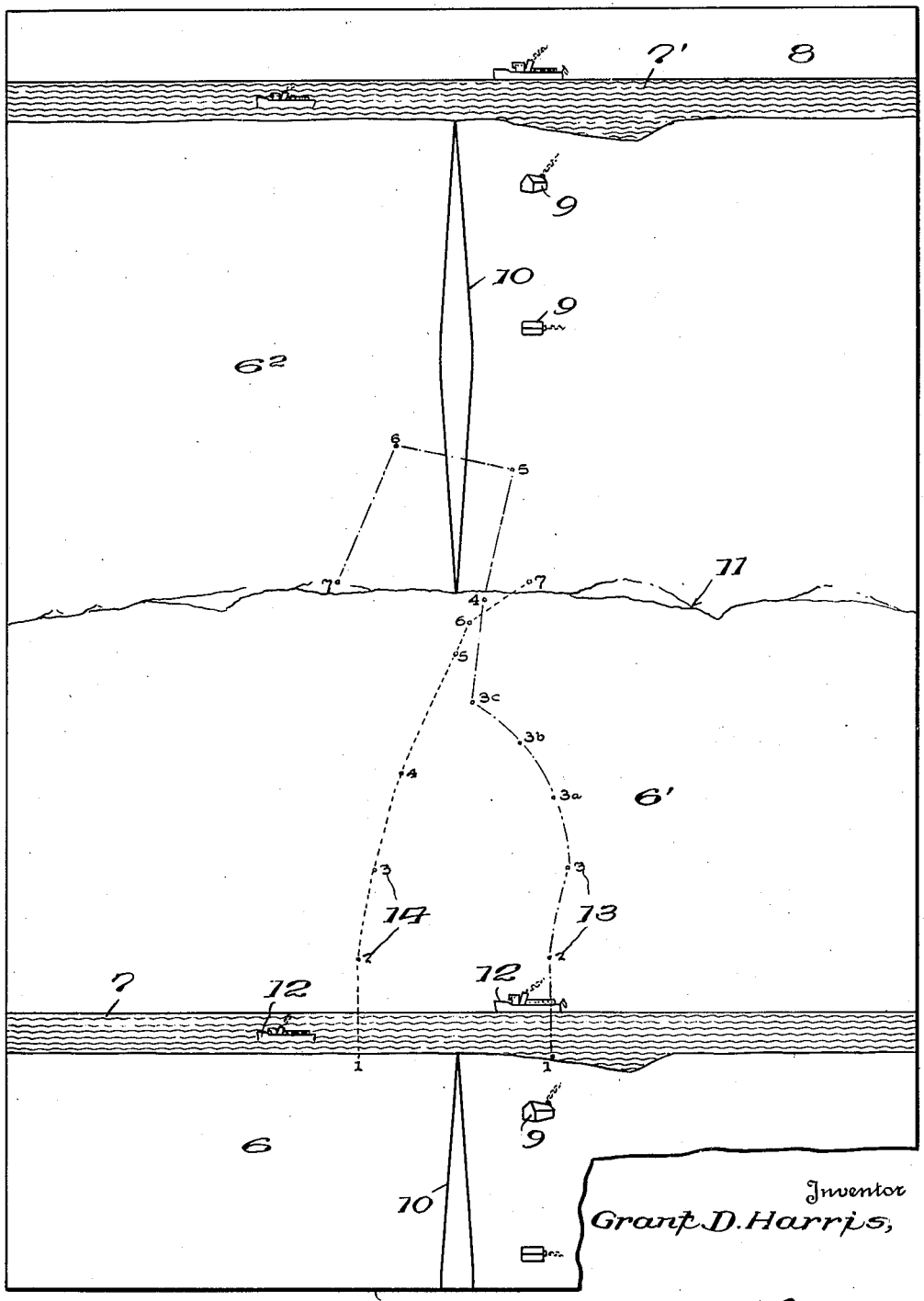

2,332,218

UNITED STATES PATENT OFFICE 2,332,218

EDUCATIONAL APPLIANCE FOR AIRPLANE OPERATION

Grant D. Harris, Washington, D. C.

Application April 4, 1942, Serial No. 437,701

5 Claims. (Cl. 35—12)

My invention consists of a simple inexpensive device, useful in the training of airplane pilots, especially in the execution of difficult maneuvers, particularly those coming in the category of acrobats, now so important for aerial combat.

An object of this invention is to employ a base or background piece upon which is scribed or portrayed a flat projection of a 360° panoramic view, with the panoramic motion at right angles to any given horizon, for coaction with a viewing piece, the latter representative of the forepart of an airplane simulating a view of a person sitting at the controls of an airplane, it is possible to visualize the apparent relationship of the airplane nose to the horizon and ground objects during maneuvers.

Other objects of this invention are to provide a viewing piece which may be constructed to simulate any type or design of aircraft; to provide a background piece having guide marks or the like, scribed or portrayed thereon, which may be followed to simulate any maneuver of which an aircraft is capable, the panoramic motion ranging at any angle from the vertical to the horizontal; to provide a viewpiece and a background piece either or both of which may be moved to comply with informative indicia on the background piece; and to provide a viewpiece which may be formed to produce a representation of an airplane ring sight or other sighting device for use in simulated maneuvers of machine-gunning, dive bombing, etc., the background piece carrying representations of enemy aircraft in varying flight positions etc., the background piece likewise including indicia which will be visible in predetermined proximity, through the simulated instrument panel, to give correct readings if the relative positions of the viewpiece and background piece are correct when a certain point is reached during the itinerary.

Other objects of the invention will be manifest from the following description of the preferred form of the invention, taken in connection with the accompanying drawings, wherein Fig. 1 is a top plan view of a background piece constructed in accordance with the teaching of the present invention;

Fig. 2 is a perspective view of a viewing piece constructed in accordance with the present invention;

Fig. 3 is a horizontal sectional view of the same, and

Fig. 4 is a top plan view of the background piece, reduced, showing a viewing piece mounted thereon in dotted lines, the viewing piece being illustrated in two different positions.

A background piece, constructed in accordance with the present invention, as illustrated to advantage in Figs. 1 and 4 and designated 5, is, in the present instance, shown to be of rectangular configuration, although any other configuration may be employed. This piece may be made of cardboard or other suitable material and has ascribed or portrayed thereon a flat projection of a 360° panoramic view, with the panoramic motion at right angles to any given horizon. This includes a simulated land portion 6, a simulated water section 7, a simulated sky section 6', and a simulated land portion $6^2$, and a further simulated water section 7', a portion of the background piece being extended to provide a section 8 representative of the horizon. Any number of land marks, such as indicated at 9 may be employed and positioned in visible proximity to the road of travel or path. The road of travel or path designated 10, may be located between the simulated horizon 11 and water section 7', a fragment of this road or path being illustrated at the bottom of the Figs. 1 and 4, this being at one extreme end of the background piece. The water may be provided with objects 12 simulating boats. If desired, these may be employed as targets.

The background piece includes consecutive numerals 13 from 1 to 7 inclusive and includes 3a, 3b, and 3c, which numerals follow a tortuous broken line beginning with the numeral 1 at the visible edge of the water section 7 and terminating at the numeral 7 at the visible edge of the horizon 11 after having passed beyond the latter and intersected the road or path 10. Indicia 14 consisting of numerals running from 1 to 7 consecutively and coursed by a dotted line are likewise used. The first four of these numerals are in substantial parallelism to the first four numerals of the indicia 13. The line coursed from 6 to 7, of indicia 14, intersects the broken line of the indicia 13, at a point adjacent the numeral 4 of said indicia 13, and terminates at the numeral 7 just beyond the horizon line 11.

A viewing piece 15 is adapted for superimpositioning on and coaction with the background piece 5. The viewing piece consists of a base 16 having a plurality of openings 17 therein, the base being also provided with a simulated instrument panel 18 upon which simulated instruments 19 are shown. The base 16 has a continuous wall 20 extending upwardly therefrom and gradually tapering or converging inwardly toward its upper end, the latter terminating in a head engaging margin 21 which may be provided with a recess 22 for the accommodation of the nose. The wall 20 is provided near the base 16 with a plurality of elongated openings 23, to permit the passage of light through the wall unto the top of the base 16 for an obvious purpose. By providing the wall 20, better concentration of vision through the base 16 is possible. The wall 20 is preferably of conventional knock-down construction so that it may be transported flat with the base 16. The viewing piece is preferably constructed of cardboard or some other relatively inexpensive material.

Preferably the background piece 5 is provided, at the near or visible edge of the water section 7, with guide arrows 24 which complement and are adapted to cooperate with arrows 25 of the base 16, adjacent the ends of the simulated instrument panel 18. The viewing piece 15, having been moved on the background piece 5 until the arrows 24 and 25 are in axial alignment, the trainee is prepared now to initiate a prescribed aeronautical maneuver. For purpose of illustration, I have in the drawings employed indicia coursed to define an acrobatic maneuver. The trainee or operator of the viewing piece, in looking through the base of the latter, at the background 5 of course represents a pilot in the cockpit of a plane. The plane ascends until a predetermined attitude is attained. This is simulated in the present invention by the viewing piece being moved on the background piece 5 in the direction of the arrows, the arrows 25 of the viewing piece traversing the broken lines and dotted lines of the background piece until the numerals 3 of the indicia 13 and 14 have been reached. At this phase of the maneuver the arrow 25 on the left side of the viewing piece remains stationary on the numeral 3 of indicia 14 as a fulcrum, while the arrow 25 on the right side follows the broken line of indicia 13 through and beyond indicia 3a, 3b and 3c. At this point in actual flight, the plane gravitates and this is simulated by the arrow 25 at the right side traversing the line from 3c to 4 while the arrow 25 at the left side of said viewing piece simultaneously traverses the dotted line from 3 to 4. Further gravitational movement is simulated by the arrow at the right side of the viewing piece traversing the broken line from 4 to 5 of indicia 13 while the arrow at the left side traverses the dotted line from 4 to 5 of indicia 14. A part of the viewing piece is now swung beyond the line 11 of the horizon and the arrow at the right side continues in its course along the broken lines from 5 to 6 and 6 to 7 of indicia 13 while the left arrow continues along the dotted line from 5 to 6 and 6 to 7 of indicia 14. When in this position, the viewing piece is completely turned on the background piece, as shown by the dotted lines at the middle of Fig. 4. In other words, the plane has now completed the maneuver and is nosed toward the opposite horizon.

Although I have herein described only a single acrobatic maneuver accomplished with the pieces of my device, herein illustrated, it is nevertheless to be understood that the background piece and viewing piece may be used for the executing of various other maneuvers within the scope of the claims hereto appended.

What is claimed is:

1. A training device for airplane pilots including a background piece depicting a panorama, and guide indicia for the execution of acrobatic maneuvers, and a viewing piece operable on and over the background piece, said viewing piece being provided with sight openings through which the panorama and indicia of the background piece are visible, and guides on the viewing piece adjacent said openings for coaction with the indicia of the background piece for the simulation, by the viewing piece, of a predetermined airplane maneuver prescribed by the indicia on the background piece.

2. A training device for airplane pilots including a background piece depicting a panorama, and a viewing piece mounted upon the background piece, a course charted on the background piece, and guides on the viewing piece for coaction with said charted course upon relative movement of the background piece and viewing piece through a predetermined cycle.

3. A training device for airplane pilots including a background piece depicting a panorama, including a view of sky and earth and a viewing piece movable on or with the background piece through a predetermined course of movement for simulating apparent views from an airplane rotating in a complete circle about its lateral axis.

4. A training device for airplane pilots including a background piece depicting a panorama and a viewing piece adapted to be laid on the background piece for relative movement thereover to depict a predetermined cycle of operation of an airplane in executing a predetermined maneuver, indicia on said background piece, visible through the viewing piece, said indicia being available to furnish actual data visible through said viewing piece when the latter is correctly positioned, with respect to the background piece, during a predetermined cycle of operation.

5. An apparatus for use in teaching aircraft piloting comprising a member having portrayed upon a surface thereof a representation of a view of sky and earth such as might be seen from an airplane in flight, a viewing piece constituting a simulated airplane provided with one or more openings, as seen from the inside of an airplane, adapted to be moved over said member by the student to create the illusion of flight.

GRANT D. HARRIS.